(12) United States Patent
Minbiole et al.

(10) Patent No.: US 10,703,867 B2
(45) Date of Patent: Jul. 7, 2020

(54) THERMAL TREATMENT OF IRRADIATED MATERIAL SOLIDS USING A HEAT TRANSFER LIQUID

(71) Applicant: E-Beam Services, Inc., Lebanon, OH (US)

(72) Inventors: Paul R. Minbiole, Cincinnati, OH (US); Daniel F. Yasenchak, Lebanon, OH (US)

(73) Assignee: E-Beam Services, Inc., Lebanon, OH (US)

( * ) Notice: Subject to any disclaimer, the term of this patent is extended or adjusted under 35 U.S.C. 154(b) by 0 days.

(21) Appl. No.: 16/303,261

(22) PCT Filed: Jun. 10, 2016

(86) PCT No.: PCT/US2016/036879
§ 371 (c)(1),
(2) Date: Nov. 20, 2018

(87) PCT Pub. No.: WO2017/213665
PCT Pub. Date: Dec. 14, 2017

(65) Prior Publication Data
US 2019/0211162 A1 Jul. 11, 2019

(51) Int. Cl.
| | | |
|---|---|---|
| C08J 3/28 | (2006.01) | |
| C08L 23/14 | (2006.01) | |
| B29C 71/04 | (2006.01) | |
| B29C 71/00 | (2006.01) | |
| B29C 71/02 | (2006.01) | |
| B29B 13/08 | (2006.01) | |
| B29B 13/02 | (2006.01) | |
| B29B 13/10 | (2006.01) | |
| C08J 7/12 | (2006.01) | |
| C08J 3/24 | (2006.01) | |
| C08L 27/24 | (2006.01) | |
| B29C 35/08 | (2006.01) | |

(52) U.S. Cl.
CPC ............... C08J 3/28 (2013.01); B29B 13/02 (2013.01); B29B 13/08 (2013.01); B29B 13/10 (2013.01); B29C 71/0009 (2013.01); B29C 71/02 (2013.01); B29C 71/04 (2013.01); C08J 3/247 (2013.01); C08J 7/123 (2013.01); C08L 23/147 (2013.01); C08L 27/24 (2013.01); B29C 2035/0877 (2013.01); B29C 2071/0027 (2013.01); B29C 2071/022 (2013.01); C08J 2323/06 (2013.01); C08J 2323/12 (2013.01); C08J 2323/28 (2013.01); C08J 2327/18 (2013.01); C08J 2327/24 (2013.01)

(58) Field of Classification Search
CPC ......... C08J 3/28; C08J 3/03; C08J 3/05; C08J 2323/10; C08J 2323/12; C08J 2323/14; C08F 2500/09; C08F 10/06; B29B 13/02; B29B 13/021; B29B 13/08
See application file for complete search history.

(56) References Cited

U.S. PATENT DOCUMENTS

| | | | |
|---|---|---|---|
| 4,220,511 A | 9/1980 | Derbyshire | |
| 4,596,728 A | 6/1986 | Yang et al. | |
| 4,916,198 A | 4/1990 | Scheve et al. | |
| 5,047,446 A | 9/1991 | DeNicola, Jr. | |
| 5,047,485 A | 9/1991 | DeNicola, Jr. | |
| 5,263,256 A * | 11/1993 | Trankiem | B05D 5/086 30/346.54 |
| 5,541,236 A | 7/1996 | DeNicola, Jr. et al. | |
| 5,554,668 A | 9/1996 | Scheve et al. | |
| 5,591,785 A | 1/1997 | Scheve et al. | |
| 5,605,936 A | 2/1997 | DeNicola, Jr. et al. | |
| 5,731,362 A | 3/1998 | Scheve et al. | |
| 6,340,718 B1 | 1/2002 | Korenev et al. | |
| 7,833,452 B2 * | 11/2010 | Muratoglu | A61L 27/16 264/235 |
| 8,220,226 B2 | 7/2012 | Minbiole et al. | |
| 8,399,536 B2 | 3/2013 | Abata et al. | |
| 2002/0060294 A1 | 5/2002 | Korenev et al. | |
| 2006/0223905 A1 | 10/2006 | Mimnaugh et al. | |
| 2007/0059445 A1 | 3/2007 | Coates et al. | |
| 2009/0243159 A1 | 10/2009 | Sun | |
| 2011/0031657 A1 | 2/2011 | Minbiole et al. | |
| 2011/0245365 A1 * | 10/2011 | Henkensmeier | C08F 255/00 522/78 |
| 2014/0183794 A1 | 7/2014 | Muratoglu et al. | |

FOREIGN PATENT DOCUMENTS

| | | | | |
|---|---|---|---|---|
| DE | 102011083076 A1 * | 3/2013 | ......... | C10M 147/02 |
| EP | 1016425 A1 | 7/2000 | | |
| JP | S48-65273 U | 9/1973 | | |
| JP | 62-256639 A | 11/1987 | | |
| JP | 01115934 A | 5/1989 | | |
| JP | H02-69533 U | 3/1990 | | |
| JP | 2004-504185 A | 2/2004 | | |

(Continued)

OTHER PUBLICATIONS

Sobue, Nature, vol. 198, Oct. 22, 1960, p. 315-316 (Year: 1960).*
Translation of DE 102011083076 (2013) (Year: 2013).*
International Searching Authority, International Search Report and Written Opinion issued in corresponding PCT Appln. No. PCT/US2016/036879 dated Sep. 8, 2016, 10 pgs.
International Searching Authority, International Preliminary Report on Patentability issued in corresponding PCT Appln. No. PCT/US2016/036879 dated Jul. 2, 2018, 8 pages.

(Continued)

*Primary Examiner* — Robert C Boyle
(74) *Attorney, Agent, or Firm* — Wood Herron & Evans LLP

(57) ABSTRACT

Irradiated material solids are thermally treated using a heat transfer liquid to improve the physical, chemical, mechanical and/or biochemical properties of the irradiated material solids.

9 Claims, No Drawings

(56) References Cited

FOREIGN PATENT DOCUMENTS

| JP | 2004224805 A | 8/2004 |
|---|---|---|
| JP | 2005-511216 A | 4/2005 |
| JP | 2005-523964 A | 8/2005 |
| JP | 2008-534123 A | 8/2008 |
| JP | 2016-536391 A | 11/2016 |
| WO | 1999010025 A1 | 3/1999 |
| WO | 2002007943 A2 | 1/2002 |
| WO | 2003049930 A1 | 6/2003 |
| WO | 2003091318 A1 | 11/2003 |
| WO | 2006107400 A2 | 10/2006 |
| WO | 2015057943 A2 | 4/2015 |

OTHER PUBLICATIONS

Wikipedia, "Degasification", May 21, 2016, retrieved from the Internet URL https://en.wikipedia.org/wiki/Degasification.

Johnson et al., "Effectiveness of Mitigation Systems in Reducing Hazards of Hydrogen Flouride Leaks", presented at First Risk Control Engineering Seminar, Oct. 1995, Maracaibo, Venezuela, retrieved from the Internet URL: http://www.questconsult.com/papers/mitigation-systems-hydrogen-flouride-leaks/.

National Research Council, "Hydrogen Flouride in Emergency Continuous Exposure Guidance Levels for Selected Submarine Contaminants", 2009, Washington (DC), National Academies Press, retrieved from the Internet URL: http://www.ncbi.nlm.nih.gov/books/NBK219903/.

European Patent Office; Extended Search Report in related European Patent Application No. 16904814.7 dated May 31, 2019; 10 pages.

European Patent Office; Notice of Intent to Grant in related European Patent Application No. 16904814.7 dated Feb. 14, 2020; 7 pages.

Butler et al.; "Removal of dissolved oxygen from water: A comparison of four common techniques", Talenta, Feb. 1994, vol. 41., No. 2., Abstract, pp. 211-215.

Japanese Patent Office, Notice of Reasons for Rejection, dated Mar. 30, 2020, 7 pgs., JPO, Tokyo, Japan.

* cited by examiner

THERMAL TREATMENT OF IRRADIATED MATERIAL SOLIDS USING A HEAT TRANSFER LIQUID

FIELD OF THE INVENTION

This invention relates to thermal treatment of irradiated material solids using a heat transfer liquid to improve various physical, chemical, mechanical and/or biochemical properties of the solids.

BACKGROUND OF THE INVENTION

Many types of products are created or improved by electron beam (e-beam), or other high-energy radiation, processing. Products include appliance parts, gaskets, manifolds, tubing, electrical connectors, molded parts, resin pellets, etc. The possibilities are endless because, in many products, property improvements can be attained through e-beam processing. Commodity resins and polymeric materials including polyethylene, ethylene vinyl acetate, polyvinyl chloride, polyamides, and certain types of rubber, such as neoprene, silicone, and ethylene-propylene rubbers, can all realize substantial property enhancement. Property improvements of these polymeric materials may include an increase in tensile strength, impact strength, abrasion resistance, chemical resistance, heat deflection, modulus, hardness, service temperature, barrier properties, crack-resistance, creep resistance, and fatigue resistance. Other special attributes can be imparted to polymers, such as heat-shrink properties, positive temperature coefficient properties, and various other special properties achieved by crosslinking or scission of polymers. Often these property improvements are achieved by the e-beam processing of formed parts.

A number of patents have been granted for processing polymeric bulk material solids, such as polypropylene, and other polyolefin polymers, to improve melt strength, heat resistance, or other physical properties, including U.S. Pat. Nos. 4,916,198; 5,047,446; 5,047,485; 5,541,236; 5,554,668; 5,591,785; 5,605,936; and 5,731,362. In general, the processes described in these patents involve treatment of finely divided polymeric material, which is layered on a traveling belt in the required environment. The speed of the traveling belt is selected so that the layer of finely divided polymeric material passes through the electron beams at a rate to receive the desired dose of radiation. Other process steps may be involved such as treatment of the irradiated polymers in a fluidized bed with nitrogen or other inert gas. Expensive equipment is employed to process the polymeric particles in the environmentally-controlled zone.

Polymeric material solids and other material solids often require thermal treatment subsequent to irradiation. Heat treating irradiated material solids is commonly accomplished in an oven, a fluidized bed reactor, or other equipment using gas as the heat transfer fluid. A number of patents have been granted. For example, in U.S. Pat. No. 4,220,511, heat treatment in a gas-based oven promotes the desired chemical reaction with free radicals furthering the chain scission of the polymer. In U.S. Pat. No. 6,340,718, involving the irradiation of polytetrafluoroethylene, there is a post-irradiation cooling step which takes place in a closed loop pneumatic path, i.e. gas-based cooling step. In the case of high-melt strength polypropylene, the free radicals imparted by irradiation are quenched at elevated temperature in a fluid bed reactor using nitrogen as disclosed in U.S. Pat. Nos. 4,916,198 and 5,047,446. Other patents and applications relate to high-melt strength polypropylene, and envision the use of gas-based heat treatment methods as disclosed in U.S. Pat. Nos. 8,220,226 and 8,399,536.

In the case of high molecular weight polyethylene (HMWPE) which is treated with irradiation to improve the physical properties, the polymeric material is subsequently heated in an oven circulating air, nitrogen or, in some cases, a gas containing a reactant like acetylene. Undesirable free radicals remaining in HMWPE after the irradiation step are quenched by heat.

Thus, irradiation of high molecular weight solid organic polymers with high-energy radiation to improve the physical and mechanical properties, followed by additional processing, with a circulation oven or similar heating device are well developed in the patent art. Almost universally, the heat treatment methods specified in the prior art patents and implemented in commercial practice utilize hot air or other gas in an oven or a fluidized bed. The elimination of expensive equipment and the simplification of the processing steps currently used would be highly desirable.

SUMMARY OF THE INVENTION

This invention is directed to a method of thermally treating irradiated material solids using a heat transfer liquid for either heating or cooling the solids. The heat transfer liquid directly contacts the solids at a temperature in order to improve the physical, mechanical, chemical and/or biochemical properties of the irradiated solid materials. The temperature or temperature range employed to thermally achieve any one or more of these properties will vary depending upon a number of factors, including, without limitation, the nature of the solid materials being treated, the improved property or properties desired for a particular solid material, the heat transfer liquid employed, treatment container and pressures employed, all of which will be understood in view of the detailed description and examples which follow. Thus, contrary to the employment of gasses for thermal treatment of irradiated solids in the prior art, this invention employs a heat transfer liquid to achieve the objectives of the treatment.

In one preferred form of this invention, water is employed as the heat transfer liquid. Water, for example, has several substantial advantages as a heat transfer liquid than the gasses that have been employed for heat treatment in the past. The density of water is approximately 1,000 times that of gasses at atmospheric pressures, meaning that the volume of the process equipment using water is a small fraction of the volume, size and capital expense of an oven, fluidized bed process or other gas-based process equipment previously employed in heat treatment of irradiated solids. Furthermore, heat capacity or specific heat of water is approximately four times that of gasses such as air or nitrogen on a unit-of-mass basis by comparison, meaning that the heat transfer equipment utilizing a liquid, such as water in this example, is much more cost-effective because it would be handling much less mass than an equivalent gas-based piece of equipment. And further yet, among the advantages of this invention, the heat transfer coefficient of the heat transfer liquid in contact with the solid material is many times higher than a heat transfer coefficient utilizing the gas contact with the solid material, thereby leading to significantly higher heat transfer rates and thus more efficient processing.

In one form of the invention, after thermally treating previously irradiated bulk material solids, the solids are readily recovered from the heat transfer liquid by simply separating the liquid. Where the solid material is a polymer, the irradiation is typically conducted to improve long chain branching, curing, chain-scissioning or crosslinking of the polymer. Where there is a need to minimize the absorption of oxygen or to reduce the level of dissolved oxygen in the heat transfer liquid, the heat transfer liquid may be treated by bubbling nitrogen or other inert gas through the liquid to drive off the dissolved oxygen. Therefore, minimized exposure to air or other oxygen source in the storage and handling systems of the solids is achieved. In addition, an oxygen scavenger can be utilized in the heat transfer liquid or system in either the preparation stage or in continuous use of the method.

In another preferred form in the invention, the heat transfer liquid comprises aqueous compositions. Therefore, the substantial advantages achieved with water can be extended to aqueous liquid heat transfer compositions. For example, the volume of process equipment, size and capital expense typically encountered in oven, fluidized bed processors or other gas-based process equipment conventionally employed can be reduced or eliminated. Further, the heat capacity achievable with an aqueous heat transfer liquid approximately four times that of gasses such as air or nitrogen, enables a much more cost effective method and system for thermally treating irradiated material solids. In addition, aqueous compositions as a heat transfer liquid in contact with the irradiated material solids enables higher heat transfer rates and more efficient processing.

Among other advantages or objectives of this invention, the use of a heat transfer liquid facilitates curing or annealing the irradiated solids. Moreover, undesirable byproducts of a gas, liquid or a solid nature after irradiation can be removed by employing the heat transfer liquid and then the byproducts can be effectively disposed of. Thermally treating the irradiated solids with the heat transfer liquid can also facilitate handling of off-gassing substances or reversing the undesired color changes imparted by irradiation, to mention a few other benefits.

DETAILED DESCRIPTION OF THE INVENTION

In one preferred form of the process, irradiated bulk material solids consist of particles (powders, pellets, chips, etc.) of thermoplastic polymers. More particularly, the polymers are exemplified by polyethylene, polyvinylchloride, polypropylene, polytetrafluorethylene, polyethylene terephthalate, polybutylene terephthalate, polyamide, ethylene vinyl acetate, thermoplastic polyurethane, chlorosulfonated polyethylene, polyester, polyvinylidene fluoride, ethylene tetrafluoroethylene, ethylene chlorotrifluoroethylene, chlorinated polyvinylidene chloride, fluorinated ethylene propylene, fluoroelastomer, polyester thermoplastic elastomer, neoprene rubber, silicone rubber, styrene-butadiene rubber, and ethylene-propylene rubber.

Property improvements for these materials as a result of electron beam processing may include an increase in tensile strength, impact strength, abrasion resistance, chemical resistance, heat deflection, modulus, hardness, surface temperature, barrier properties, stress-crack resistance, creep resistance, and fatigue resistance. In the case of polytetrafluoroethylene, irradiation enables the subsequent creation of micropowders. This inventive process of electron beam processing can also be used for crystal structure modification (gemstone coloration) and to increase silicon solid-state device switching speed. As indicated above, polymer parts such as nuts, screws, bolts, washers, spacers, rivets, spray nozzles, filters, fittings, adapters, plugs, tubing, strainers, bottles, vials, gaskets, o-rings, seals, probes, couplings, connectors, cable ties, bearings, wheels, bumpers, rollers, sheaves, gears, bushings, belts, and other functional polymeric parts can also be electron beam processed to improve properties using this inventive process.

As a further objective and advantage of this invention, the irradiated material solids are heat treated with the heat transfer liquid in a container or sealed vessel and thus, environmental effects are avoided by processing the solid materials within the container. Furthermore, the material solids during and after processing in the liquid can be handled effectively and conveniently. Handling advantages can be enjoyed in subsequent treatment steps in certain applications. The heat treated irradiated solids can be recovered from the heat transfer liquid by separation and the heat transfer liquid is reusable in many cases.

Other advantages of the inventive method include elimination of expensive equipment used in known methods such as environmentally-controlled chambers, fluidized beds, mixing and/or handling equipment, dust and pollution control equipment, etc. In addition, the potential for environmental contamination with open-traveling beds, ovens, or with prior art techniques is avoided. Control over the material solids being processed is achieved utilizing the principles of this invention. These and other advantages and objectives of this invention will be understood with reference to the examples.

EXAMPLE 1

The following is an example of thermally treating previously-irradiated material solids directly with a heat transfer liquid. In this example the end product is fluorinated ethylene propylene (FEP) polymer resin particles with an increased melt index level, which is preferred for specific applications. In this case, the FEP is irradiated in order to cause chain scission of the polymer and thus increasing the melt index to the desired level. The subsequent thermal treatment is used to quench the chain scission reaction at a subsequent point in time such that the desired melt index is achieved and thereafter maintained. Conventionally, the FEP particles would be placed in a convection oven for thermal treatment in a gaseous environment.

In this example, three samples of FEP particles were irradiated in air to a dose of 200 kGy. The first sample was not thermally treated at all. The second sample was thermally treated in the conventional manner in a convection oven at 175° C. for three hours. The third sample was thermally treated directly in an oil bath heated to 175+/−5° C. for three hours by direct contact of the FEP particles with the oil in the bath. In this case, mineral oil was used but glycols or other hydrocarbon liquids could have been employed. Further, aqueous mixtures of glycols or other compatible liquids can be used.

The FEP material had a starting melt index of 2 dg/min as measured per ASTM D1238. The irradiated sample that was not thermally treated had its melt index measured at 48, 72 and 96 hours after irradiation. The melt index was 30 dg/min after 48 hours, 40 dg/min after 72 hours, and 44 dg/min after 96 hours. For the second sample, the conventional thermal treatment was conducted 72 hours after irradiation, and the melt index was measured at 41 dg/min; and 96 hours later the melt index remained at 41 dg/min. For the third sample, which was directly thermally treated in oil 72 hours after irradiation, the melt index was measured at 40 dg/min; and 96 hours later the melt index remained at 40 dg/min. (See table below.) These results demonstrate the desired melt index increase effects of irradiation, and then demonstrate that the thermal quenching treatment using a heat transfer liquid is as effective as the conventional gas-based/convection oven method.

| | Melt Index, dg/min (ASTM D1238) | | | |
|---|---|---|---|---|
| | 0 hr. | 48 hr. | 72 hr. | 96 hr. |
| Not heat treated | 2 | 30 | 40 | 44 |
| Conventional (oven) heat treated | 2 | — | 41 | 41 |
| Liquid heat treated | 2 | — | 40 | 40 |

EXAMPLE 2

Another example of thermally treating previously-irradiated material solids, using a heat transfer liquid, is the production of crosslinked ultra-high molecular weight polyethylene (UHMWPE). In this case, the irradiation-crosslinked UHMWPE solid material needs to have removed from it, by thermal treatment, the free radicals created during the irradiation process in order to prevent long term degradation of the polymer (see U.S. Pat. Nos. 6,641,617 and 7,714,036. The UHMWPE solids are often placed in a low oxygen environment to limit the oxidation reactions that can otherwise occur within the polymer solid due to the broken bonds created during the irradiation process. Conventionally, for thermal treatment after the irradiation, the UHMWPE would be placed in a convection oven while remaining in the vacuum-sealed packaging.

In this example, two vacuum-sealed samples were irradiated to a dose of 75 kGy. One sample was placed in a convection oven as described above. A second sample was removed from the packaging and placed in water that had been treated with nitrogen so as to reduce the dissolved oxygen level to less than 0.3 ppm. A third sample was not irradiated and used as a control. The samples were then tested for creep at a temperature of 200° C. after 120 minutes under a load of 20 pounds per square inch. The untreated sample had creep result of 0.08%. The sample which was irradiated and conventionally thermally treated had a creep measurement of 0.01%. The sample which had been irradiated and thermally treated in water had a creep measurement of 0.01%. These results demonstrate the creep-reduction effects of crosslinking and that thermal treatment with a heat transfer liquid is as effective as the conventional gas-based/convection oven method.

EXAMPLE 3

Another example of thermally treating previously-irradiated material solids, wherein the solid material is a polymer, using a heat transfer liquid, is the production of long-chain branched polypropylene. In this case the purpose of the thermal treatment is (1) to enable the creation of branches of the long-chain branched polypropylene and (2) to quench the free radicals and so to end the reaction.

The linear polypropylene resin particles were placed within a plastic film packaging, and then vacuum packaged to control the environment and at the same time to create a rigid rectangular block out of bulk material. The resulting block of polypropylene was then irradiated on each side (See U.S. Pat. No. 8,220,226) to a bulk average dose of 50 kGy. Conventionally (as in U.S. Pat. No. 5,047,446), the polypropylene material is subsequently thermally treated to a temperature appropriate for branching (e.g. 80° C.) and then to a temperature appropriate for the quenching of free radicals (e.g. 120° C.) using hot nitrogen to prevent oxygen from causing undesired reactions; or alternatively it is thermally treated in the plastic film packaging. Instead, in this example, the irradiated resin particles were removed from the packaging and placed directly in a pressure vessel containing water that had been treated with nitrogen to reduce the dissolved oxygen level in the water to less than 0.3 ppm. The temperature of the resin-water combination was held at 80° C. for 15 minutes to effect branching and then increased to 120° C. for 30 minutes to quench the free radicals.

The resulting long-chain branched polypropylene was measured to have had its valuable melt tension property increased to greater than 20 centi-newtons (cN) after the process compared to 2-3 cN prior to irradiation and thermal treatment. The melt tension was measured per ISO 16790. The melt index of the long-chain branched polypropylene was measured at approximately 2 dg/min compared to 0.7 dg/min prior to irradiation and thermal treatment. The melt index was measured per ASTM D1238.

Additional trials were conducted at different branching temperatures of 60° C. to 80° C. and at a higher irradiation dose. The results are given in the following table.

| Sample | Dose, kGy | Branching Time, minutes | Branching Temperature, ° C. | Melt Strength, cN | Melt Index, dg/min |
|---|---|---|---|---|---|
| 1 | 50 | 15 | 60 | 26 | 2.4 |
| 2 | 50 | 15 | 80 | 21 | 1.9 |
| 3 | 65 | 15 | 60 | 50 | 1.6 |
| 4 | 65 | 15 | 80 | 40 | 1.4 |

The effectiveness of the thermal treatment with a heat transfer liquid is thus demonstrated.

EXAMPLE 4

Another example of thermally treating previously-irradiated material solids, using a heat transfer liquid, is the production of polytetrafluoroethylene (PTFE) fine powders or micropowders. Solid PTFE materials (often scrap, recycled, or off-specification PTFE) are irradiated to reduce the molecular weight of the PTFE polymer, which enables the subsequent milling or grinding of the PTFE into a fine powder. One purpose of the subsequent thermal treatment is to achieve an even greater reduction in molecular weight by thermally promoting and continuing the chain-scission reaction via free radicals initiated by the irradiation. A conventional process for thermally treating the PTFE after irradiation (See U.S. Pat. No. 4,220,511) is to place it in a convection oven for, for example, 6 hours at 250° C.

In this example, three samples of PTFE chips were irradiated to a dose of 400 kGy in air. One sample was placed in a convection oven for thermal treatment at 250° C. for 4 hours. The second sample was submerged in a glycerin bath at 250° C. for 4 hours. The third PTFE sample was not thermally treated.

In order to determine the decrease in molecular weight, the melt flow index was measured for each of the samples at a temperature of 360° C. and a 2.16 kg weight. The raw PTFE chips did not flow. The sample that was not heat treated measured an 8.9 dg/min flow, approximately 40% lower than that of the heat treated samples, which measured above 12 dg/min. Both heat treated samples measured nearly identical results. The results are in the following table.

| Sample | Dose, kGy | Heat treatment | Melt index (360° C., 2.16 kg), dg/min |
|---|---|---|---|
| Unirradiated PTFE chips | None | None | No flow |
| No heat treatment | 400 | None | 8.9 |
| Convection oven heat treatment | 400 | 250° C., 4 hours | 12.4 |
| Glycerin bath heat treatment | 400 | 250° C., 4 hours | 12.3 |

These results demonstrate, in the case where post-irradiation thermal treatment is desired to maximize the chain-scission reaction started by irradiation, that thermal treatment with a liquid heat transfer agent is as effective as the conventional gas-based/convection oven method.

A further purpose of thermally treating irradiated PTFE, which has been extensively utilized in actual practice, is to remove from the PTFE material any residual hydrogen fluoride (HF), a by-product of PTFE irradiation. Typically, a convection oven is used for this purpose. Alternatively, water can be used as the heat transfer fluid and the hydrogen fluoride effectively dissolves into the water, thus providing a method of separating HF or undesirable by-products of irradiation.

The foregoing description of this invention is not intended to be limiting and a person of ordinary skill in the art understands that variation or departures therefrom can be made without deviating from the scope of this invention.

What is claimed is:

1. A method of increasing the melt strength of polypropylene or copolymers thereof comprising:
    irradiating bulk polymer particles of substantially linear polypropylene polymer or copolymers thereof to form long-chain branched propylene polymers or copolymers, directly contacting said irradiated bulk polymer particles with a heat transfer liquid comprising water or an aqueous composition at a temperature to form heat-treated bulk polymer particles to facilitate long-chain branching and to subsequently deactivate all free radicals present in the irradiated bulk polymer particles, whereby the melt strength of the polypropylene or copolymers thereof is increased.

2. The method of claim 1 comprising the additional step of recovering the heat-treated bulk polymer particles from the heat transfer liquid.

3. The method of claim 1 wherein said step of directly contacting with the heat transfer liquid comprises heat treating, curing or annealing the irradiated bulk polymer particles, or quenching free radicals of the irradiated bulk polymer particles.

4. The method of claim 1 comprising separating contaminants or undesirable by-products from the irradiated bulk polymer particles by means of the heat transfer liquid.

5. The method of claim 1 comprising directly contacting said irradiated bulk polymer particles with said heat transfer liquid in a container to form the heat-treated bulk polymer particles.

6. The method of claim 5 wherein said container is a pressure vessel for directly contacting said irradiated bulk polymer particles with said heat transfer liquid under pressure to form the heat-treated bulk polymer particles.

7. The method of claim 6 comprising separating said heat-treated bulk polymer particles from said container.

8. The method of claim 1 wherein the heat transfer liquid is purged with nitrogen or other inert gas prior to and/or during said directly contacting step.

9. The method of claim 1 wherein an oxygen scavenger is utilized in the heat transfer liquid to minimize the absorption of oxygen by the heat-treated bulk polymer particles.

\* \* \* \* \*